United States Patent
Faranda et al.

(10) Patent No.: US 8,547,067 B2
(45) Date of Patent: Oct. 1, 2013

(54) CIRCUIT ARRANGEMENT AND METHOD FOR DETECTING A CHARGE

(75) Inventors: Leo Faranda, Rodgau (DE); Frank Stefan Skopp, Eschborn (DE); Torsten Klemm, Eschborn (DE)

(73) Assignee: BRAUN, GmbH, Kronberg (DE)

( * ) Notice: Subject to any disclaimer, the term of this patent is extended or adjusted under 35 U.S.C. 154(b) by 288 days.

(21) Appl. No.: 12/889,729

(22) Filed: Sep. 24, 2010

(65) Prior Publication Data

US 2011/0012567 A1 Jan. 20, 2011

Related U.S. Application Data

(63) Continuation-in-part of application No. PCT/IB2010/051191, filed on Mar. 18, 2010.

(30) Foreign Application Priority Data

Mar. 19, 2009 (EP) .................................. 09003939

(51) Int. Cl.
*H02J 7/00* (2006.01)
*H02M 3/07* (2006.01)

(52) U.S. Cl.
USPC ........... 320/132; 320/166; 320/165; 320/149; 320/158; 307/109; 307/110; 363/59

(58) Field of Classification Search
USPC ....................................................... 320/132
See application file for complete search history.

(56) References Cited

U.S. PATENT DOCUMENTS

| | | | |
|---|---|---|---|
| 4,654,575 A | | 3/1987 | Castleman |
| 5,773,969 A | * | 6/1998 | Nakayama et al. ........... 323/330 |
| 6,218,818 B1 | * | 4/2001 | Kim .............................. 323/284 |
| 6,384,579 B2 | * | 5/2002 | Watanabe ..................... 320/166 |
| 6,735,802 B1 | * | 5/2004 | Lundell et al. ................. 15/22.1 |
| 6,737,847 B2 | * | 5/2004 | Watanabe et al. ............. 323/288 |
| 2007/0139982 A1 | * | 6/2007 | Ueno et al. ....................... 363/59 |
| 2007/0194759 A1 | * | 8/2007 | Shimizu et al. ................ 320/166 |
| 2008/0060148 A1 | * | 3/2008 | Pinyayev et al. ............... 15/22.1 |
| 2008/0174252 A1 | * | 7/2008 | Mertens et al. ................ 315/290 |

FOREIGN PATENT DOCUMENTS

| | | |
|---|---|---|
| EP | 0875978 | 11/1998 |
| EP | 1432097 | 6/2004 |

OTHER PUBLICATIONS

International Search Report and Written Opinion, mail date Jun. 2, 2010, 10 pages.

* cited by examiner

*Primary Examiner* — Yalkew Fantu
(74) *Attorney, Agent, or Firm* — David Michael Weirich; Vladimir Vitenberg (57) ABSTRACT

A circuit arrangement that has an energy source that can provide a charging voltage for charging an electrical energy storage unit in a charging circuit when it is connected to an energy supply, wherein it is possible to represent the charging voltage using an alternating quantity, and that has a capacitor circuit having a first capacitor element, a first valve element, and the energy source, wherein the first capacitor element is charged by the energy source via the first valve element if the charging voltage is negative, so that, if the charging voltage is positive, the voltage over the first capacitor element has the same orientation in the capacitor circuit, in terms of sign, as the charging voltage, and the voltage over the capacitor element.

20 Claims, 6 Drawing Sheets

CIRCUIT ARRANGEMENT AND METHOD FOR DETECTING A CHARGE

CROSS REFERENCE TO RELATED APPLICATION

This application is a continuation-in-part application of prior copending International Application No. PCT/IB2010/051191, filed Mar. 18, 2010, designating the United States.

FIELD OF THE INVENTION

The invention relates to a circuit arrangement and to a method for detecting whether a charging voltage or charging current is available that can be used, for example, for charging a small battery-operated electrical device, such as, for example, an electric toothbrush.

BACKGROUND OF THE INVENTION

Battery-operated electrical devices, for example, small electrical devices such as electric toothbrushes or electric shavers, are normally charged in a charging station that is external to the device. During the charging process, it is then possible to initiate certain functions, such as, for example, a charge control display, and to suppress certain functions, like turning on the toothbrush. Therefore, there is a requirement to be able to detect at any point in time whether the device is in the charging station or not. To this end a more or less complex logic unit is provided in the device, which evaluates the presence of a charging voltage for the battery. This logic unit may be, but does not have to be, separate from the circuit components (charging current circuit and control logic) that control the charging process itself. Because the charging devices normally resemble an ideal current source rather than an ideal voltage source, the charging voltage clearly drops below the no-charge value when under a charge—that is, when charging current is flowing. This charging voltage is then barely enough to be reliably evaluated by a logic unit, especially in devices that have small battery cell voltages.

It is known to use the charging current circuit on the source side of the charging current switch via an ohm resistive potentiometer to tap the charging voltage, which is variable as a function of the charging current flux. If a charging voltage is present, that is, if the charging current circuit is open, the charging voltage is at its maximum, and if a charging current is flowing the charging voltage drops. A microcontroller performs the evaluation. It is disadvantageous that current flows via the ohm resistive potentiometer continuously, which leads to continuous energy consumption. Thus, it would be desirable to provide a circuit arrangement that makes it possible to detect a charge without great complexity.

BRIEF DESCRIPTION OF THE DRAWINGS

The circuit arrangement will be described in greater detail using exemplary embodiments and the drawings.

DETAILED DESCRIPTION OF THE INVENTION

Accordingly, a circuit arrangement is provided that has an energy source that can provide a charging voltage for charging an electrical energy storage unit in a charging circuit when it is connected to an energy supply, wherein it is possible to represent the charging voltage using an alternating quantity, and that has a capacitor circuit having a first capacitor element, a first valve element, and the energy source, wherein the first capacitor element is charged by the energy source via the first valve element if the charging voltage is negative so that, if the charging voltage is positive, the voltage over the first capacitor element has the same orientation in the capacitor circuit, in terms of sign, as the charging voltage, and the voltage over the capacitor element and the energy source can be detected using a control apparatus. The detectable charging level $U_{CD}$ is not related to whether current is flowing in the charging circuit or not, i.e. whether a charging transistor is connected or not.

Thus, during the negative half-wave of the charging voltage, the first capacitor element is charged via the first valve element. During the positive half-wave of the charging voltage, the first valve element blocks so that the first capacitor element cannot be discharged using it. In the capacitor circuit (that is, in the loop including the energy source, the first capacitor element, and the first valve element), the voltage generated by the charging via the capacitor element has the same orientation, in terms of sign, as the charging voltage during the positive half-wave. For the charge detection signal (which can be tapped via the first valve element), the first capacitor element, together with the first valve element, has an amplifying effect. If the charging voltage is zero, which is equivalent to "device not in charging station", then the charge detection signal is also zero.

If no voltage limiting measures are provided, it is possible to attain a voltage swing that is approximately twice the peak value of the charging voltage. Thus, the charge detection signal receives a voltage swing that may be twice the negative charging voltage. Because the charge detection signal has a large enough voltage swing, it can be reliably detected, e.g. using a semiconductor logic unit.

Because the capacitor does not have to be completely recharged in the capacitor circuit during the charging process of the energy storage unit, a corresponding charge on the energy source or energy supply is avoided.

If a microcontroller is used for detecting the charge detection signal, the charge detection signal can be used for a so-called pin change interrupt. The pin change interrupt can be used to "wake up" the microcontroller from the sleep mode if the charge detection signal exceeds a prespecified threshold. Thus the microcontroller can remain in the energy-saving sleep mode as long as the charge detection signal is below the threshold, that is, it does not have to "wake up" regularly to check whether device is connected to the charging station. This minimizes the closed-circuit current for the charging apparatus. Another advantage is that the frequency of the charging part can also be measured this way.

A second valve element may be present that is arranged between a direct voltage and the first valve element and limits the voltage over the energy source and the capacitor element to the sum of the direct voltage and the forward voltage of the second valve element. Thus, the direct current can be used for selectively adjusting the maximum voltage—that is, the voltage swing—using the capacitor element and the energy source. Thus the maximum voltage can be adjusted corresponding to the technical specification of the detection logic unit. For detecting two states, e.g. up to 20% of the maximum voltage can be provided for the "low" status and more than 80% of the maximum value can be provided for the "high" status.

In addition, a control apparatus may be present that is designed for detecting the voltage over the capacitor element and the energy source. The energy source can include a coil element that can be connected to energy. Then the charging apparatus can be designed as an inductive charging apparatus for the energy storage unit. The energy storage unit may also be a battery.

A third valve element for rectifying the charging voltage may also be arranged in the charging circuit, wherein the capacitor circuit is arranged upstream from the third valve element in the direction of the charging current.

A first resistor element may be arranged in the capacitor circuit for limiting the charging flux in the capacitor circuit.

The first valve element and/or the second valve element may be arranged inside the control apparatus. The protective circuit by means of external diodes may be omitted when using an internal function element for the control apparatus, which further reduces the materials required to create the circuit.

The first valve element can be a Zener diode element. This leads to a limitation of the positive charge detection voltage using the breakdown voltage of the Zener diode element and to a limitation of the negative charge detection voltage using the forward voltage of the Zener diode element.

A pull down element may be arranged parallel to the first valve element over which the first capacitor element may be discharged if the circuit arrangement is not connected to the energy supply. The defined complete discharge of the capacitor element further improves the charge detection.

A voltage converter may be arranged thereon that is designed for supplying the control apparatus. It may be used when the operating voltage for the control apparatus is greater than the charging voltage.

For supplying the control apparatus during charging, the capacitor circuit may comprise a fourth valve element that is in series with the first capacitor and a second capacitor element parallel to the first valve element. Then it is possible to omit the aforementioned voltage converter for supplying the control apparatus.

The invention may also include a small electrical device, for example, an electric shaver or toothbrush, having such a circuit arrangement.

A controllable circuit element that is designed for switching the charging current may be arranged in the charging circuit. Then the charging current can advantageously be controlled or regulated, which protects the battery.

The invention may also comprise a method for charge detection in a charging apparatus having an energy source that can provide a charging voltage for charging an electrical energy storage unit in a charging circuit when it is connected to an energy supply, wherein it is possible to represent the charging voltage using an alternating quantity, wherein a first capacitor element is charged by the energy source via a first valve element when the charging voltage is negative so that when the charging voltage is positive, the voltage over the first capacitor element has the same orientation in the capacitor circuit, in terms of sign, as the charging voltage, and the voltage over the capacitor element and the energy source can be detected using a control apparatus.

A second valve element may be arranged between a direct voltage and the first valve element limit the voltage over the energy source and the capacitor element to the sum of the voltage for the direct voltage and the forward voltage of the second valve element. The voltage over the capacitor element and the energy source may be detected by means of a control apparatus. The charging voltage may be rectified by means of a third valve element. The first capacitor element may be discharged via a pull down element that is arranged parallel to the first valve element when the circuit arrangement is not connected to the energy supply. The method can be used in a small electrical device, for instance an electric toothbrush.

Figure 1:
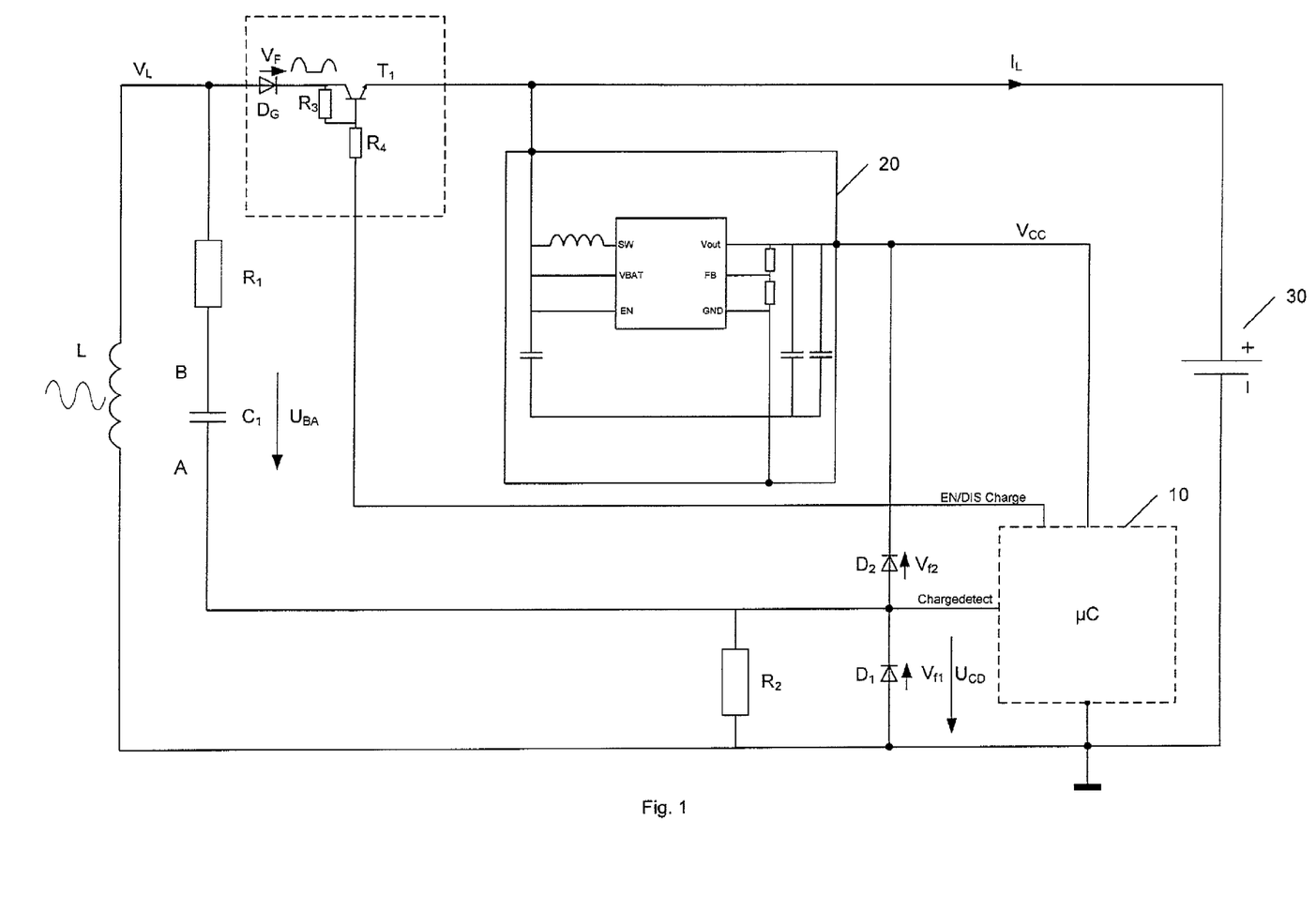
FIG. 1 shows a circuit diagram of a first embodiment of a circuit arrangement.

One exemplary embodiment of a circuit arrangement according to the present invention is shown in FIG. 1 and may be used in an electric circuit for a small electrical device, for instance a rechargeable electric toothbrush or electric shaver. The energy is transferred inductively from a charging station connected to a power supply to the toothbrush. To this end, energy is connected via a charging coil L (as energy source) into the circuit and is supplied to a battery 30 using a charging circuit. The potential $V_L$ present on the charging coil L is an alternating quantity. A diode DG that is arranged in the charging circuit is provided as a valve element for rectifying the charging current $I_L$. The diode DG acts as a half-wave rectifier, thus only a half wave is let through and used for charging the battery 30. The charging current $I_L$ is turned on and off in the charging circuit via a charging transistor T1 as a switching element that is controlled by means of a microcontroller 10.

Moreover, a direct current converter (boost converter) 20 is provided that supplies the microcontroller 10 with an operating voltage $V_{CC}$ that is higher than the battery voltage. The direct current converter 20 is supplied from the battery 30.

When the device is in the charging station, the open circuit voltage $V_I$ results on the charging coil L as charging voltage $V_L$, namely when no battery charging current $I_L$ is flowing, or $U_A$ (battery voltage level)+$U_{CE}$ (collector emitter voltage of the transistor T1)+$U_F$ (forward voltage over the diode DG) with the positive half-wave of the charging voltage $V_L$ if the battery charging current $I_L$ is flowing. Then, during the positive half-wave of the charging voltage, the charging circuit is charged such that the charging voltage $V_L$ drops. In contrast, the negative half-wave always has a higher peak voltage because no charging current flows into the battery (because the diode DG blocks it); therefore the source is not charged.

Figure 2:
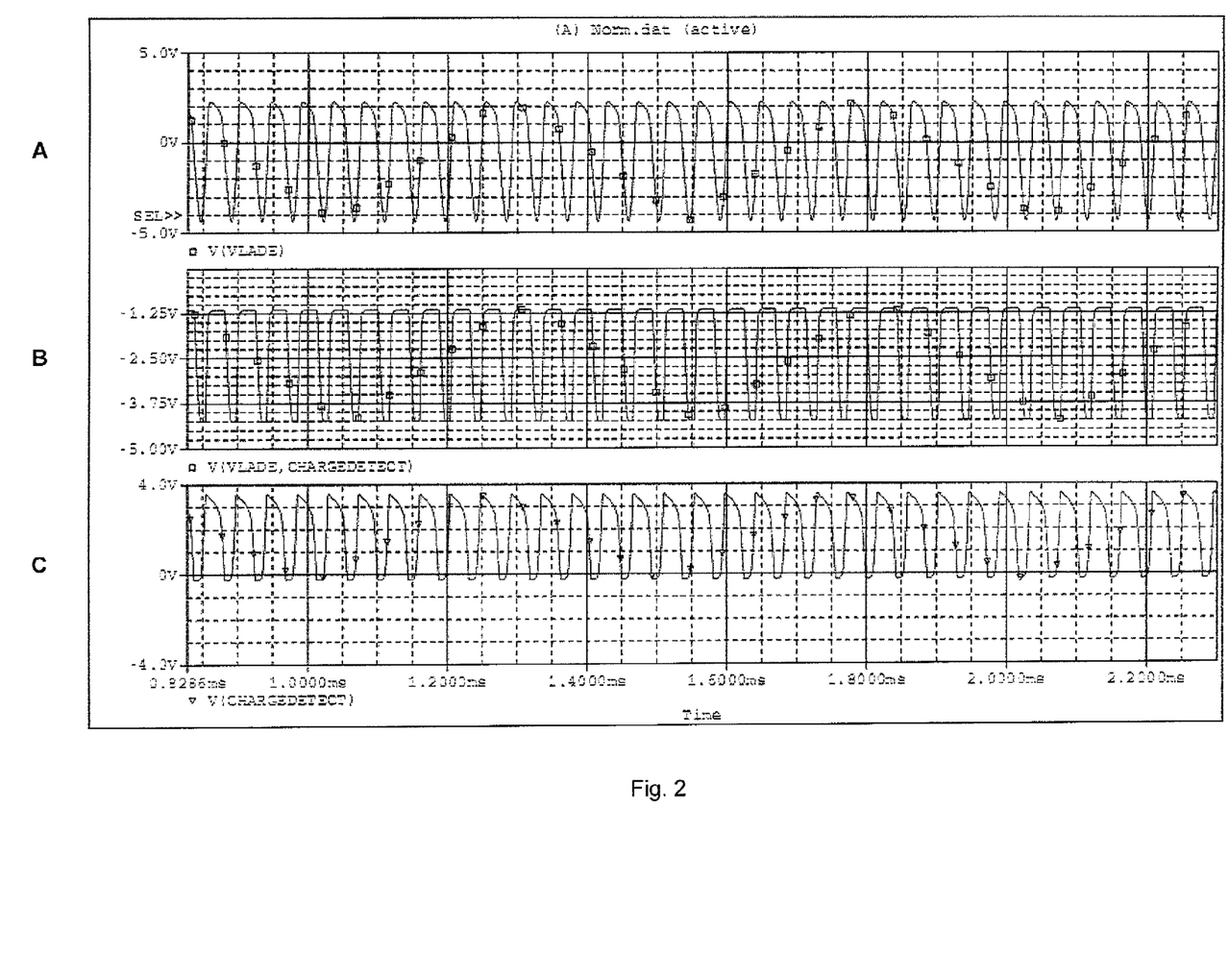
FIG. 2 shows signal variations for the first embodiment.

FIG. 2, Diagram A, depicts the progression over time of the charging voltage $V_L$ when the charging current can flow (transistor T1 is enabled). The charging voltage thus alternates between about 1.35 V and −4.5 V in the example.

Figure 3:
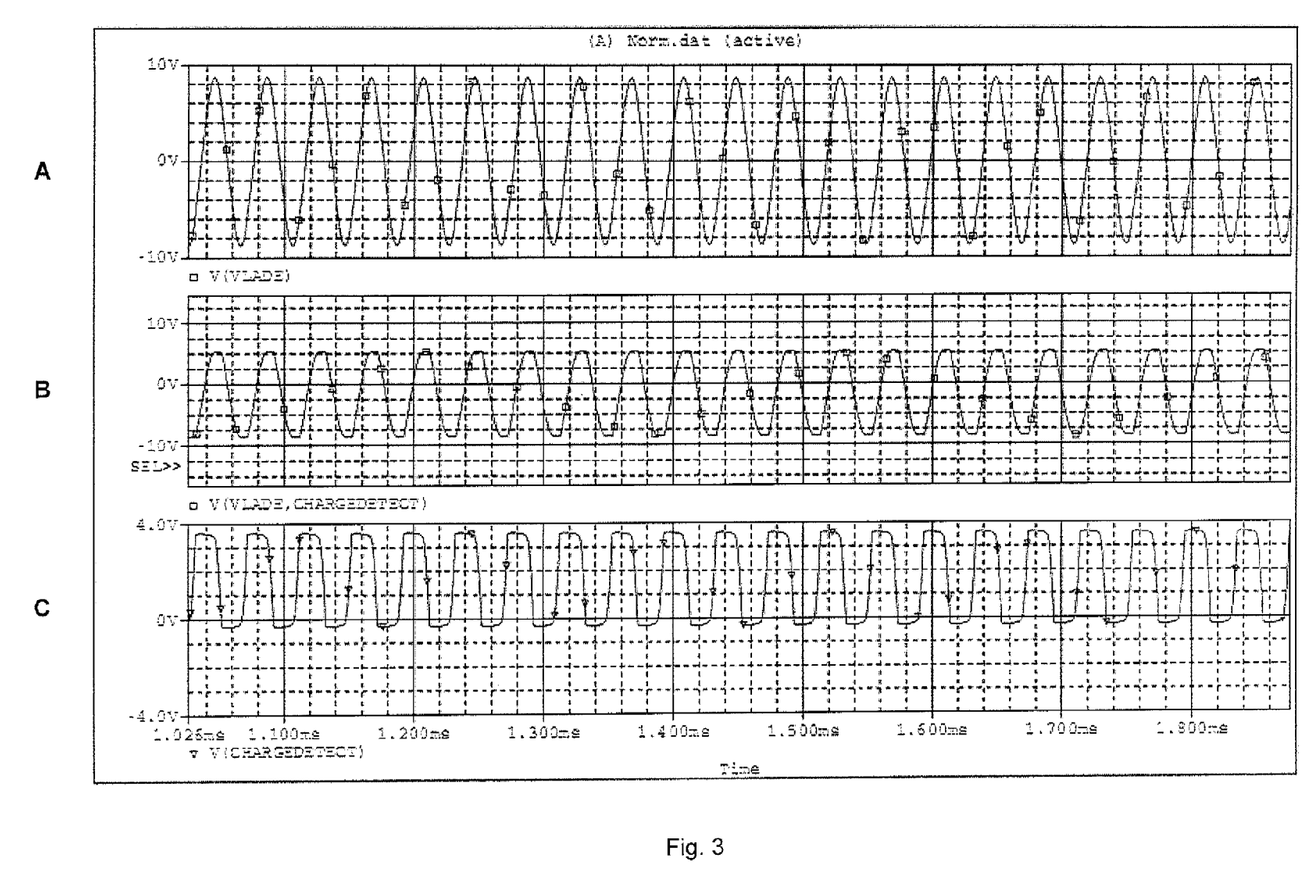
FIG. 3 shows signal variations for the first embodiment.

FIG. 3, Diagram A, depicts the progression over time of the charging voltage $V_L$ when no charging current can flow into the battery 30 (transistor T1 is blocked stationary). In this case the charging circuit is open so that the charging voltage attains the maximum value |$V_I$|, in the example about 9V, with both half-waves. If the battery charging current $I_L$ is flowing, the peak for the negative half-wave is lower than the "actual" open circuit voltage, that is, if no charging current $I_L$ is flowing, because an oscillator found in an external charging station that connects the energy via the charging coil L itself receives energy only during the positive half-wave and then only decays during the negative half-wave.

The capacitor circuit may optionally comprise a series circuit of capacitor C1, resistor R1, first diode element D1, and charging coil L. These elements thus form a loop. The voltage $U_{CD}$, which drops over the coil L and the capacitor C1 in the capacitor circuit or in the loop, is used for the charge detection signal. The charge detection signal $U_{CD}$ indicates whether the device is in the charging station or not. The charge detection signal $U_{CD}$ is supplied to the microcontroller 10, which evaluates it.

In terms of voltage, Capacitor C1 is non-symmetrically attached to the microcontroller 10, specifically via a second diode D2, which is on a direct current $V_{CC}$, and the first diode D1. Diagram B in FIG. 2 and FIG. 3 illustrates this in that the voltage progression $U_{BA}$ is plotted over the capacitor C1. The curves in Diagram B in FIG. 2 and FIG. 3 are nearly in phase with the curves in Diagram A. Thus, in the capacitor circuit, the charging voltage $V_L$ and $U_{BA}$ have the same orientation, and thus have the same sign.

This is how the capacitor C1 charges when the device is in the charging station. During the positive half-wave of the charging voltage $V_L$, the voltage is then $U_{CD}=V_{CC}+V_{f2}$ ($V_{f2}$ forward voltage over diode D2). During the negative half-wave of the charging voltage $V_L$, the voltage is $U_{CD}=-V_{f1}$ (forward voltage over diode D1). Diagram C of FIG. 2 and FIG. 3 respectively depicts the voltage progression for the charge detection signal $U_{CD}$.

The charge detection voltage $U_{CD}$ on the pin "Chargedetect" of the microcontroller 10 thus fluctuates between $V_{CC}+V_{f2}$ and the negative forward voltage over the diode D1 ($-V_{f1}$). The value of the charging voltage $V_L$ can be much lower than $V_{CC}+V_{f2}$, and thus does not play any role in the detectability of the charge detection.

The charge detection voltage $U_{CD}$ thus attains the order of magnitude of the voltage $V_{CC}$ and is therefore a reliably evaluatable signal (with a swing that is large enough) for the presence of the charging voltage $V_L$ or the charging current flux $I_L$ (if the charging transistor T1 is enabled) in the charging circuit.

A comparison of the two curves of the charge detection voltage $U_{CD}$ according to FIG. 2C and FIG. 3C demonstrates that the voltage swing is practically unrelated to whether a charging current $I_L$ is presently flowing or not. If the charging voltage $V_L$ is present (which has the same meaning as the status "device in charging station"), then the charge detection voltage $U_{CD}$ is at the maximum value.

The charge detection voltage $U_{CD}$ is continuously "zero" as long as the device, in this example the electric toothbrush, is not in the charging station.

The charging voltage $V_L$, and thus the charge detection voltage $U_{CD}$, as well, typically has a frequency on the order of magnitude of 30 kHz. Since only the maximum value of the charge detection voltage is of interest, not the frequency, the charge detection signal can be detected using control electronics.

The resistor R1 limits the charging flux in the capacitor circuit, that is, the current in the port of the microcontroller 10. A resistor R2 is arranged parallel to the diode D1 in the capacitor circuit. Resistor R2 is a pull down resistor that ensures that the capacitor C1 discharges completely when there is no charge detection signal $U_{CD}$, that is, if the device is no longer connected to the charging station.

Figure 4:
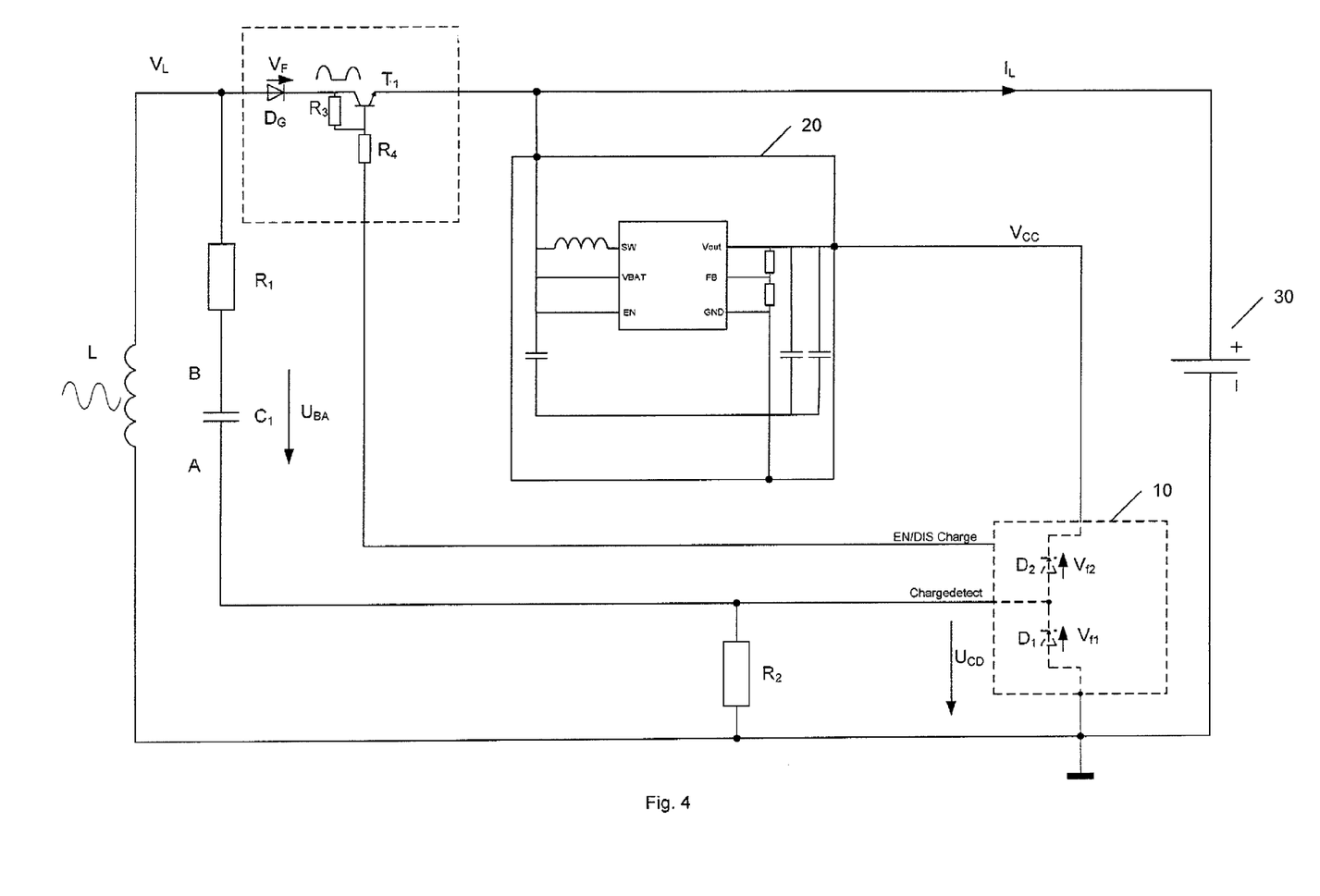
FIG. 4 shows a circuit diagram of a second embodiment of a circuit arrangement.

FIG. 4 depicts a second embodiment of the circuit arrangement in which both diodes D1 and D2 are integrated in the microcontroller 10. Then they can be omitted from the external protective circuit.

Figure 5:
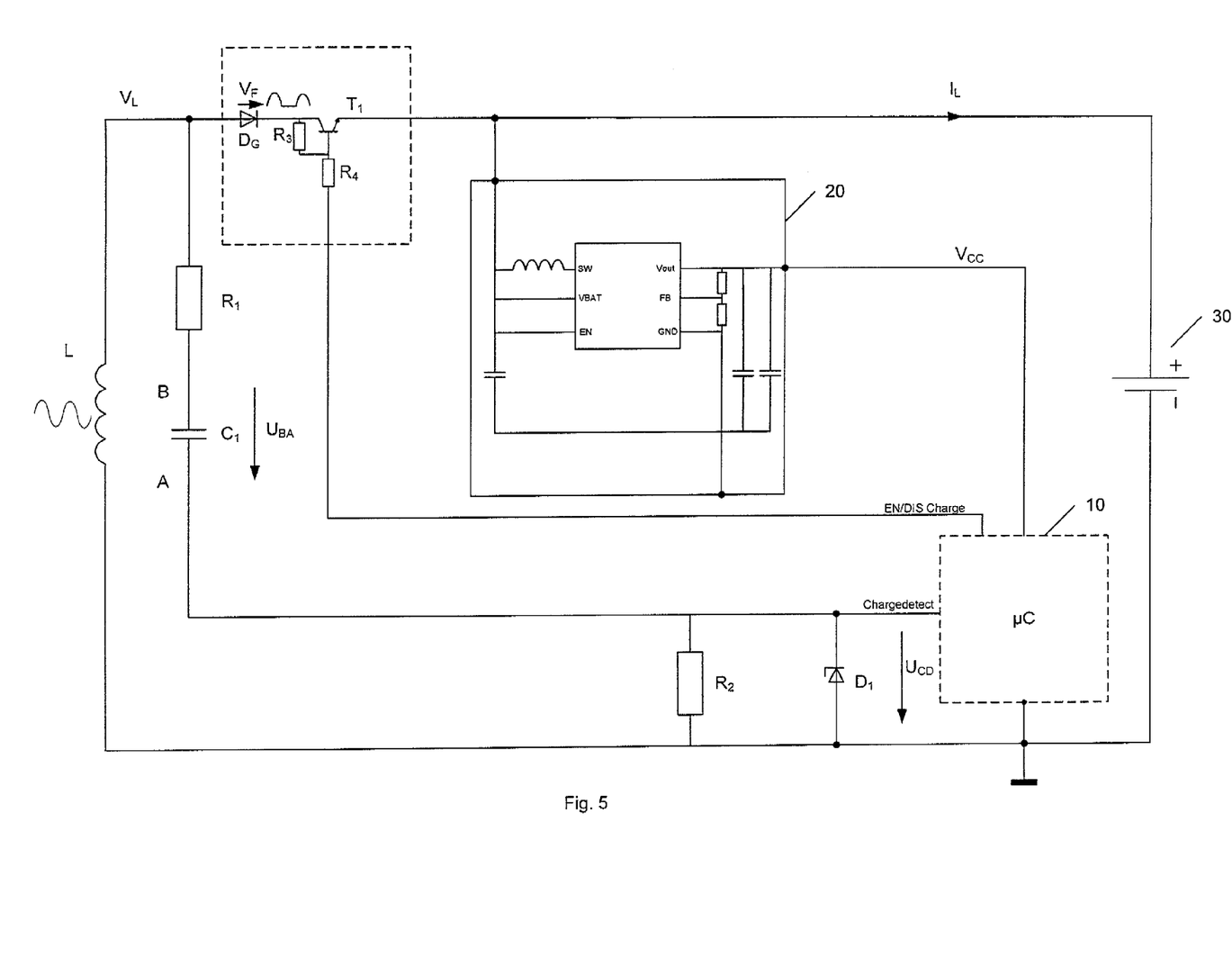
FIG. 5 shows a circuit diagram of a third embodiment of a circuit arrangement; and, FIG. 6 shows a circuit diagram of a fourth embodiment of a circuit arrangement.

FIG. 5 depicts a third embodiment of the circuit arrangement in which the diode D1 is designed as a Zener diode. In this case, the positive voltage on the pin "Charge/detect" is limited to the breakdown voltage of the Zener diode and the negative voltage through the forward voltage of the Zener diode in the forward direction.

Depending on the layout of the charging coil voltage and the resistor R1, the charge detection can be relatively high-resistance so that it hardly loads the charging part.

Figure 6:
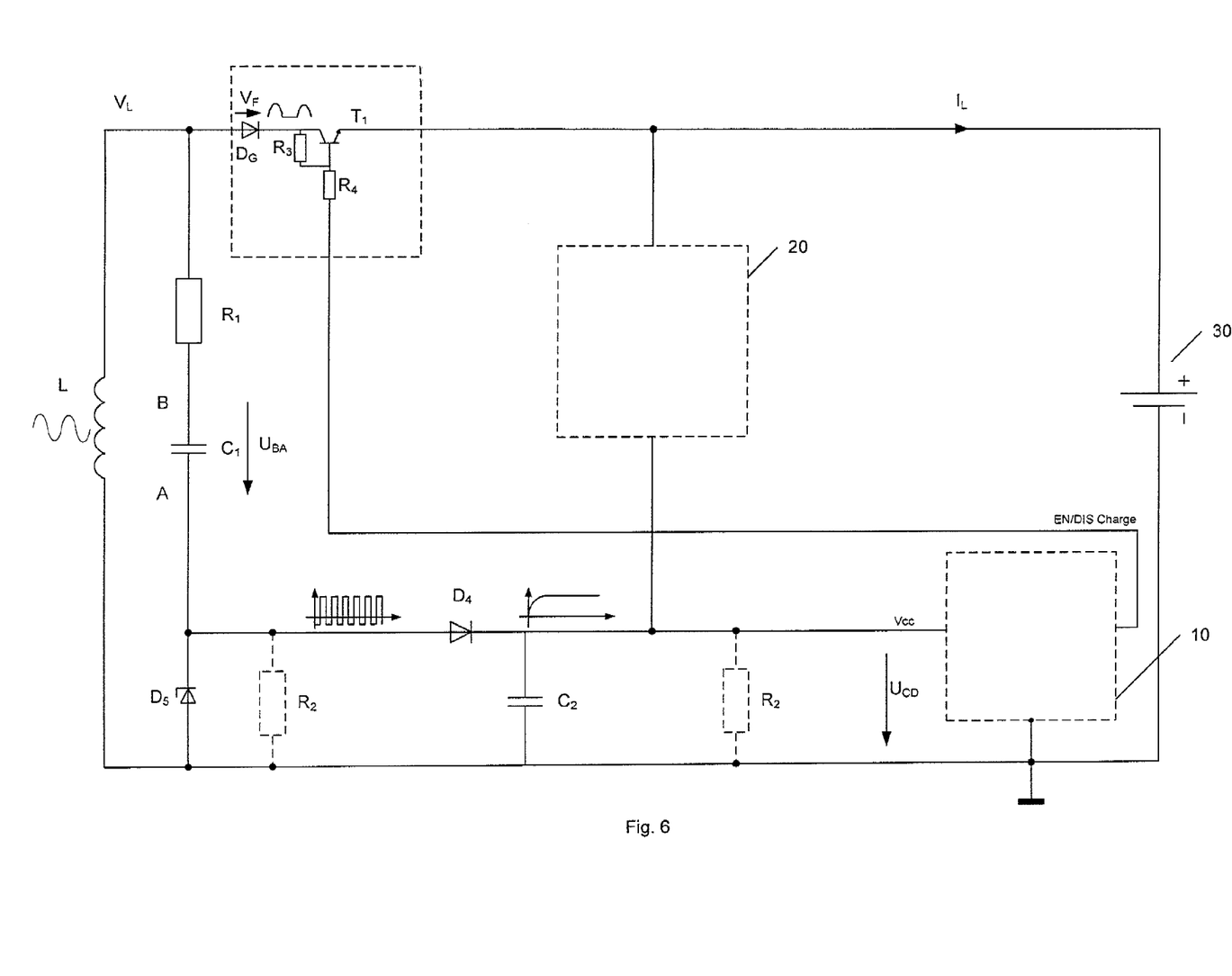

Moreover, the third embodiment can be modified such that the capacitor circuit can be used as the current supply for a circuit when the device is connected to the charging station. FIG. 6 depicts this variant as the fourth embodiment of a circuit arrangement. A rectifier diode D4 is added to the capacitor circuit, and a capacity C2 is parallel to a Zener diode D5 that has the function of the diode D1 depicted in FIGS. 1, 4, and 5. The capacity C2 and the diode D4 form a rectifier in the capacitor circuit, and the diode D4 rectifies the current in the capacitor circuit. The Zener diode D5 limits the sum of the voltage $U_{CD}$ and diode voltage $V_{f4}$ to its breakdown voltage.

The resistor R1 and capacity C1 in this case may be adjusted such that an adequate charge can flow. However, the resistor R1 can be omitted altogether depending on how the circuit is laid out.

In all of the embodiments, a different logic unit—analog or digital—may be used for evaluating the charge detection signal instead of a microcontroller 10. Moreover, the voltage converter 20 may be designed differently; it does not have to be a "boost converter". Element 20 then stands for any desired element that brings the voltage of the battery 30 to the required level for the supply voltage $V_{CC}$ of the unit 10.

In all embodiments, the charging transistor T1 is only optional, that is, it can be omitted. If there is no charging transistor T1 present, there is no option for the charging control for the battery, however, the charge detection function remains.

Moreover, the described charge detection also functions in a charging mechanism having full-wave rectification instead of half-wave rectification using the diode DG. Then the capacitor circuit is arranged in the diode branch of the one half-wave, and thus it only monitors the part of the charging signal for the one half-wave.

The described circuits are not limited to use in electric toothbrushes. In fact, they may also be used in other devices such as e.g. electric shavers, household appliances, and communications devices.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:
1. A circuit arrangement having:
   an AC energy source that can provide an alternating charging voltage for charging an electrical energy storage unit in a charging circuit when the electrical energy storage unit is connected to an energy supply, wherein the alternating charging voltage is represented by an alternating quantity;

and having a capacitor circuit having a first capacitor element, a first valve element, and the energy source, wherein the first capacitor element is charged by the energy source via the first valve element if the charging voltage is negative, so that if the charging voltage is positive, the voltage over the first capacitor element has the same orientation in the capacitor circuit, in terms of sign, as the charging voltage, and the voltage over the capacitor element and the energy source can be detected using a control apparatus.

2. The circuit arrangement according to claim 1, further including a second valve element arranged between a direct voltage and the first valve element that limits the voltage over the energy source and the capacitor element to the sum of the direct voltage and the forward voltage of the second valve element.

3. The circuit arrangement according to claim 1, wherein when the charging voltage is negative and the voltage over the first valve element is limited to the forward voltage of the first valve element.

4. The circuit arrangement according to claim 2, further having a control apparatus for detecting the voltage over the capacitor element and the energy source.

5. The circuit arrangement according to claim 1, wherein the energy source comprises a coil element that can be used to connect energy.

6. The circuit arrangement according to claim 1, further including a third valve element arranged in the charging circuit for rectifying the charging voltage, wherein the capacitor circuit is arranged upstream of the third valve element in the direction of the charging current.

7. The circuit arrangement according to claim 1, wherein a first resistor element is arranged in the capacitor circuit for limiting the charging flux in the capacitor circuit.

8. The circuit arrangement according to claim 1, further including a second valve element, wherein at least one of the first valve element and the second valve element is arranged within the control apparatus.

9. The circuit arrangement according to claim 1, wherein the first valve element includes a Zener diode.

10. The circuit arrangement according to claim 1, further including a pull down element arranged parallel to the first valve element over which the first capacitor element may be discharged if the circuit arrangement is not connected to the energy supply.

11. The circuit arrangement according to claim 1, further including a voltage converter for supplying the control apparatus.

12. The circuit arrangement according to claim 1, wherein the capacitor circuit includes a fourth valve element in series with the first capacitor element, and a second capacitor element parallel to the first valve element.

13. The circuit arrangement according to claim 1, wherein the circuit arrangement is arranged in a small electrical device and the energy storage unit is a battery.

14. The circuit arrangement according to claim 1, further including a controllable circuit element for switching the charging current disposed in the charging circuit.

15. A method for charge detection in a circuit arrangement having an AC energy source that provides an alternating charging voltage ($V_L$) for charging an electrical energy storage unit in a charging circuit when it is connected to an energy supply, wherein the alternating charging voltage ($V_L$) is represented by an alternating quantity, wherein a first capacitor element is charged by the energy source via a first valve element when the charging voltage ($V_L$) is negative, so that when the charging voltage ($V_L$) is positive, the voltage ($U_{BA}$) over the first capacitor element has the same orientation in the capacitor circuit, in terms of sign, as the charging voltage ($V_L$), and the voltage ($U_{CD}$) over the capacitor element and the energy source can be detected using a control apparatus.

16. The method according to claim 15, wherein a second valve element is disposed between a direct current and the first valve element and limits the voltage over the energy source and the capacitor element to the sum of the voltage for the direct voltage and the forward voltage of the second valve element.

17. The method according to claim 15, wherein the voltage over the capacitor element and the energy source is detected by a control apparatus.

18. The method according to claim 15, wherein the charging voltage is rectified by a third valve element.

19. The method according to claim 15, wherein the first capacitor element is discharged when the circuit arrangement is not connected to the energy supply via a pull down element that is arranged parallel to the first valve element.

20. The method according to claim 15 used in a small electrical device.

* * * * *